(12) United States Patent
Yoshida et al.

(10) Patent No.: US 6,704,077 B1
(45) Date of Patent: Mar. 9, 2004

(54) REFLECTION TYPE LIQUID CRYSTAL DISPLAY WITH SELECTIVE REFLECTOR

(75) Inventors: Tetsushi Yoshida, Kanagawa-ken (JP); Toshiomi Ono, Hachioji (JP); Tetsuya Kusuno, Iruma (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 09/384,010

(22) Filed: Aug. 26, 1999

(30) Foreign Application Priority Data

| Aug. 31, 1998 | (JP) | 10-259181 |
| Sep. 1, 1998 | (JP) | 10-261024 |
| Sep. 17, 1998 | (JP) | 10-280487 |
| Sep. 25, 1998 | (JP) | 10-287354 |
| Sep. 25, 1998 | (JP) | 10-287355 |

(51) Int. Cl.[7] ........................... G02F 1/1333
(52) U.S. Cl. ........................... 349/113; 349/86
(58) Field of Search ........................... 349/86, 113

(56) References Cited

U.S. PATENT DOCUMENTS

| 4,591,233 A | * | 5/1986 | Fergason | 349/86 |
| 5,303,073 A | * | 4/1994 | Shirota et al. | 349/74 |
| 5,408,344 A | * | 4/1995 | Takiguchi et al. | 349/57 |
| 5,818,554 A | * | 10/1998 | Hiyama et al. | 349/113 |
| 5,929,956 A | * | 7/1999 | Neijzen et al. | 349/113 |
| 6,130,733 A | * | 10/2000 | Lowe | 349/86 |
| 6,285,426 B1 | * | 9/2001 | Akin et al. | 349/114 |
| 6,433,847 B1 | * | 8/2002 | Minoura | 349/113 |

FOREIGN PATENT DOCUMENTS

JP    06-347775    12/1994

* cited by examiner

*Primary Examiner*—Kenneth Parker
(74) *Attorney, Agent, or Firm*—Frishauf, Holtz, Goodman & Chick, P.C.

(57) ABSTRACT

A liquid crystal display device is provided which includes a scattering/transparent liquid crystal cell having a liquid crystal layer for controlling incident light in a scattered or transparent state in accordance with an applied electric field, and a selective reflector arranged on a side of the liquid crystal layer opposite to a side where observation is performed. The reflector has reflecting characteristics to cause light, which has come incident from a direction within a predetermined range of a viewing angle that allows observation of the liquid crystal cell, to reflect in a direction outside the range of the viewing angle on the side where observation is performed.

1 Claim, 16 Drawing Sheets

REFLECTION TYPE LIQUID CRYSTAL DISPLAY WITH SELECTIVE REFLECTOR

BACKGROUND OF THE INVENTION

The present invention relates to a reflection type liquid crystal display device using a liquid crystal cell for controlling light in a scattered or transparent state.

In a conventional, liquid crystal display device, a polymer-dispersed liquid crystal display element or a scattering/transparent liquid crystal display element such as a liquid crystal cell has been developed, because the liquid crystal cell has a simpler structure than that of a TN type liquid crystal cell, can be manufactured easily, and utilizes light at a higher rate without using a polarizing plate. In the polymer-dispersed liquid crystal display element, a liquid crystal layer in which a polymeric material and a liquid crystal are dispersed is sealed between a pair of substrates respectively having transparent electrodes.

In this polymer-dispersed liquid crystal display element, in the electric field OFF mode wherein no voltage is applied across a pair of transparent electrodes, the liquid crystal molecules are aligned in a random manner in the liquid crystal layer to exhibit a scattered state. In the electric field ON mode, the liquid crystal molecules are aligned in the direction of electric field in the liquid crystal layer to exhibit a transparent state.

To perform monochromatic display with this liquid crystal display device, an optical element such as a black light absorber, a scattering reflection plate, or a specular reflection plate is arranged on the rear side of the polymer-dispersed liquid crystal cell. In the electric field OFF mode wherein no voltage is applied across the electrodes of the liquid crystal cell, the liquid crystal cell exhibits the scattered state. When the user observes scattered light, white display can be obtained. In the electric field ON mode wherein a voltage is applied across the electrodes of the liquid crystal cell, the liquid crystal cell at a portion applied with the electric field exhibits the transparent state. The optical element arranged on the rear side of the liquid crystal cell can be observed directly to be seen black. Alternatively, the user may observe weak reflected light or may not observe reflected light, so that the portion applied with the electric field is displayed in black.

In this liquid crystal display device, if a black light absorber is used as an optical element to obtain the darkest black display, although black display can be assured, bright white display cannot be obtained. This is due to the following reason. When light passing through the liquid crystal layer is scattered, it produces backward scattered light directed opposite to the propagating direction of light passing through the liquid crystal cell, and forward scattered light directed along the propagating direction of light coming incident on the liquid crystal cell. Of the backward and forward scattered light, the forward scattered light, i.e., light directed toward the rear surface of the liquid crystal cell, is absorbed by the light absorber.

In a liquid crystal display device using a scattering reflection plate as the optical element, in the electric field ON mode, light transmitted through the liquid crystal cell is scattered by the scattering reflection plate, and part of the scattered light is transmitted through the liquid crystal cell again and is observed. Hence, sufficient black display cannot be assured.

In a liquid crystal display device using a specular reflection plate as the optical element, a high contrast is obtained under specific observation conditions. However, due to the specular properties of the reflection plate, the observer himself is reflected in the reflection plate, black display glitters, or the range of a viewing angle is narrow.

BRIEF SUMMARY OF THE INVENTION

It is an object of the present invention to provide a reflection type liquid crystal display device in which bright white display and dark black display are assured to improve the contrast, so that a wide visual angle can be obtained.

In order to achieve the above object, according to the first aspect of the present invention, there is provided a reflection type liquid crystal display device using a liquid crystal cell for controlling light in a scattered or transparent state, comprising: a scattering/transparent liquid crystal cell having a liquid crystal layer for controlling incident light in the scattered or transparent state in accordance with an applied electric field; and a selective reflector arranged on a side of the liquid crystal layer opposite to a side where observation is performed, and having reflecting characteristics to cause incident light, which has come incident from a direction within a predetermined range of a viewing angle that allows observation of the liquid crystal cell, to emerge in a direction outside the range of a viewing angle.

In this liquid crystal cell device according to the first aspect, either a scattered state or a transparent state is selected for light that has passed through the liquid crystal layer (to be referred to as transmitted light hereinafter) upon application of an electric field. When the transmitted light is in the transparent state, light coming incident within the range of a viewing angle can be caused to emerge in a direction outside the range of a viewing angle using an incident angle at which the transmitted light comes incident on the selective reflector, so this light is not observed. Thus, dark display can be obtained from the observing direction. When the transmitted light is in the scattered state, the scattered light emerges at an angle within the range of a viewing angle. Thus, bright display can be obtained.

In the liquid crystal display device according to the first aspect, the selective reflector has a light incident surface that forms prisms on which a plurality of slants inclined in opposite directions are aligned, and a specular reflection layer formed on at least one of two slants of the plurality of slants.

In the liquid crystal display device using this selective reflector, its exit direction can be adjusted by the angles of the slants and the incident angle. The emerging direction of light coming incident at an angle within the range of a viewing angle can be set outside the range of a viewing angle.

In the liquid crystal display device according to the first aspect, the selective reflector may have a first optical layer where light-transmitting portions and light-absorbing portions are aligned alternately, and a second optical layer where light-absorbing portions and light-reflecting portions are aligned alternately, the first and second optical layers opposing each other at a predetermined distance, while the light-transmitting portions of the first optical layer and the light-absorbing portions of the second optical layer are set to correspond to each other and the light-absorbing portions of the first optical layer and the light-reflecting portions of the second optical layer are set to correspond to each other.

In the selective reflector of this liquid crystal display device, light, coming incident on it from near the direction of normal to the front surface of the selective reflector, i.e., light from a direction within the range of a viewing angle, can be absorbed by the respective light-absorbing portions formed on the first or second optical layer. Light inclined from the direction of normal, and light coming incident at an angle outside the range of a viewing angle, can be transmitted through the light-transmitting portions of the first optical layer, be reflected by the light-reflecting portions of the second optical layer, and be transmitted through the light-absorbing portions of the first optical layer, to emerge from the front surface of the selective reflector.

Transmitted light in the transparent state, which has come incident at an angle within the range of a viewing angle, does not emerge from the front surface of the selective reflector. Hence, dark display can be obtained. Transmitted light in the scattered state emerges from the front surface of the selective reflector, so that bright display can be obtained. Since this selective reflector has a simple structure, it can be easily manufactured from the selective reflector having the prism structure described above.

According to the second aspect of the present invention, there is provided a reflection type liquid crystal display device using a liquid crystal cell for controlling light in a scattered or transparent state, comprising:

a scattering/transparent liquid crystal cell having a liquid crystal layer interposed between a pair of substrates to control incident light in the scattered or transparent state in accordance with an applied electric field; and a selective reflector arranged on a side of the liquid crystal layer opposite to a side where observation is performed, and having angle-selective reflecting characteristics to transmit first incident light, coming incident at a first angle range within a predetermined range of a viewing angle to allow observation of the liquid crystal cell, and to reflect second incident light, coming incident within outside the range of the first range of viewing angle, in a direction outside the first range of a viewing angle, of light passing through the liquid crystal layer, the selective reflector transmitting the first incident light coming incident within the range of a viewing angle toward a rear surface of the device, and reflecting the second light coming incident outside the range of the first viewing angle toward the liquid crystal layer.

In the liquid crystal cell device according to the second aspect, either a scattered state or a transparent state is selected for light that has passed through the liquid crystal layer upon application of an electric field. When the transmitted light is in the transparent state, light coming incident at an angle within the range of a viewing angle can be caused to emerge in a direction toward the rear surface of the selective reflector by an incident angle at which the transmitted light comes incident on the selective reflector, so this light is not observed. Thus, dark display can be obtained from the observing direction. When the transmitted light is in the scattered state, the scattered light emerges at an angle within the range of a viewing angle. Thus, bright display can be obtained.

In this liquid crystal display device, the selective reflector has a light-incident surface that forms prisms on which a plurality of slants inclined in opposite directions are aligned, a specular reflection layer formed on one of two slants of the plurality of slants, and a transparent surface formed on the other one of the two slants, and the device has a surface light source unit constituted by a light source, having an exit surface opposing a rear side of the device, and a light guide.

In this liquid crystal display device, a specular reflection layer is formed on some slants of the selective reflector, and the remaining slants are formed transparent. Since the surface light source unit is formed on the rear side of the selective reflector, in addition to light coming incident from the front surface of the liquid crystal cell, light emerging from the surface light source unit can be transmitted through the transparent surface formed on the selective reflector, and can be utilized as back illumination light. Thus, this liquid crystal display device can be used at a dark place as well.

According to the third aspect of the present invention, there is provided a reflection type liquid crystal display device using a liquid crystal cell for controlling light in a scattered or transparent state, comprising:

a scattering/transparent liquid crystal cell having a plurality of thin films formed on at least one of a pair of substrates, and a liquid crystal layer interposed between the pair of substrates, to control incident light in the scattered or transparent state in accordance with an applied electric field; and a selective reflector arranged outside one of the substrates which forms a rear surface of the liquid crystal cell, and having a reflecting surface having a predetermined angle of inclination so that light, coming incident on the liquid crystal cell outside the range of a viewing angle, comes incident on an either one of interfaces among the plurality of thin films and the pair of substrates at an incident angle satisfying a total reflection condition which prevents light to emerge toward a front surface of the liquid crystal cell.

With the liquid crystal display device according to the third aspect, light coming incident at an angle outside the range of a viewing angle, which is largely inclined with respect to the normal to the front surface of the liquid crystal cell, is caused by the selective reflector to be totally reflected by either one of the interfaces of the plurality of thin films and the pair of substrates, and does not emerge toward the front surface of the liquid crystal cell. Since unnecessary light does not emerge, when the liquid crystal cell is in the transparent state to transmit light passing through it, it decreases unnecessary exit light to obtain dark display, thereby improving the contrast.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 2A and 2B are sectional views of a liquid crystal cell according to the first embodiment of the present invention, in which FIG. 2A shows a state wherein no voltage is applied across the substrates, and FIG. 2B shows a state wherein a voltage is applied across the substrates;

FIGS. 16A and 16B are views showing the paths of light in the liquid crystal display device according to the fifth embodiment, in which FIG. 16A shows a state wherein an electric field is not applied to the liquid crystal layer, and FIG. 16B shows a state wherein an electric field is applied to the liquid crystal layer.

DETAILED DESCRIPTION OF THE INVENTION

First Embodiment

Figure 1:
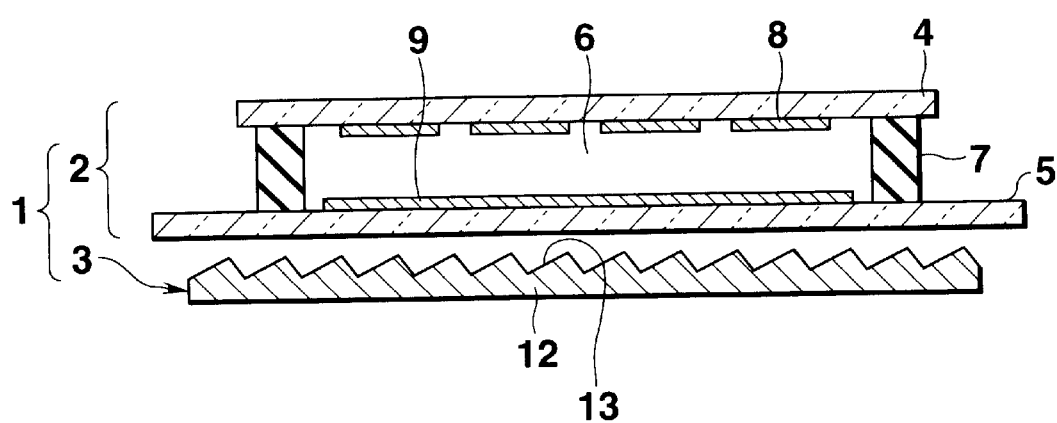
FIG. 1 is a sectional view showing a liquid crystal display device according to the first embodiment of the present invention.
Figure 2A:
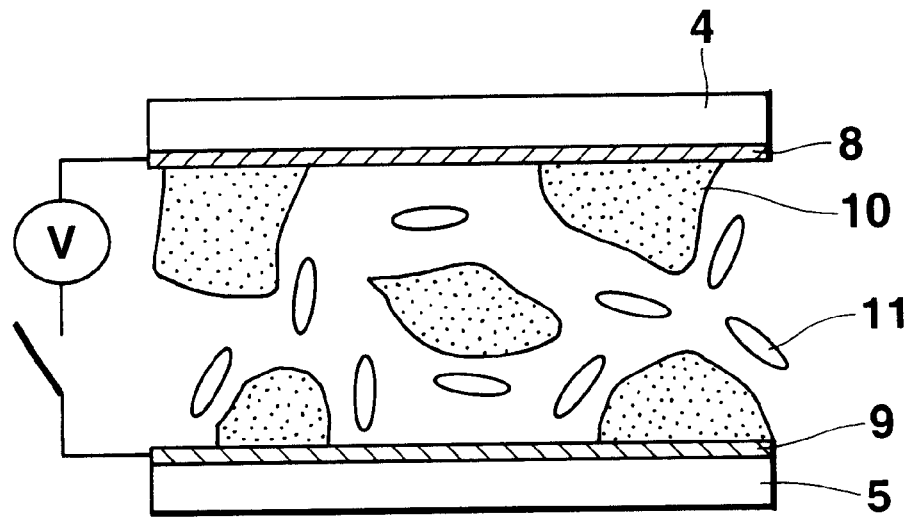
Figure 2B:
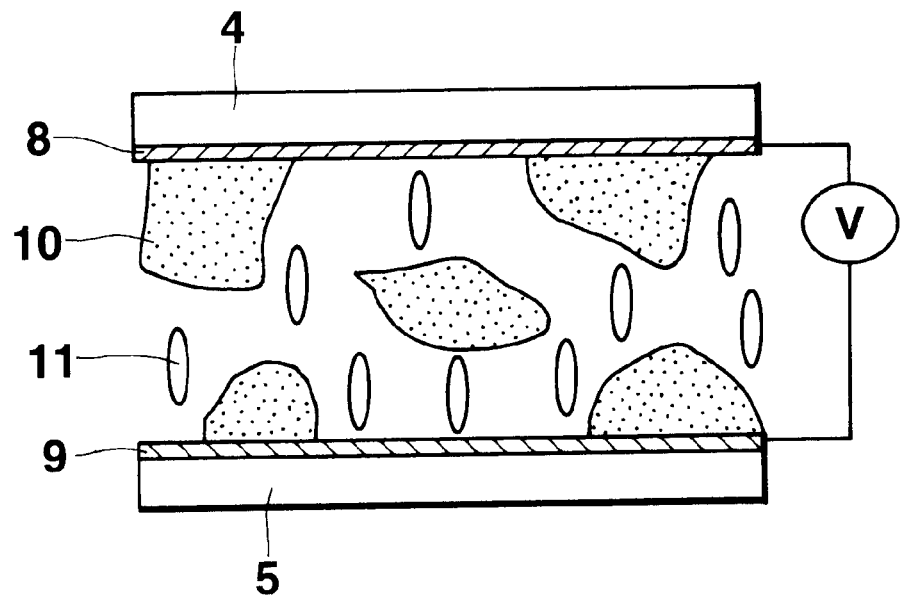
Figure 3:
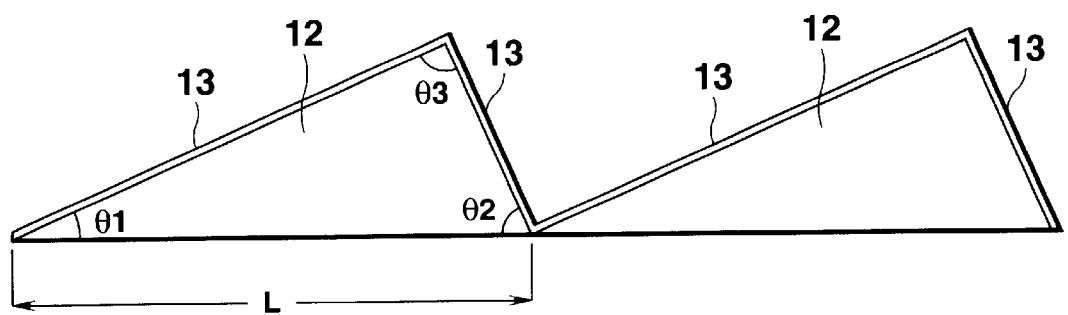
FIG. 3 is a partial enlarged view of the liquid crystal display device shown in FIG. 1 according to the first embodiment of the present invention.

FIGS. 1, 2A, 2B and 3 show a liquid crystal display device according to the first embodiment of the present invention, in which FIG. 1 is a sectional view of the liquid crystal display device, FIGS. 2A and 2B are enlarged sectional views of the main part of the liquid crystal display device to explain its operation principle, and FIG. 3 is an enlarged sectional view of the main part of FIG. 1.

As shown in FIG. 1, this liquid crystal display device 1 has a polymer-dispersed liquid crystal cell 2 and a selective reflector 3 arranged to oppose the rear surface of the liquid crystal cell 2. In the liquid crystal cell 2, a liquid crystal layer 6 is sealed between a pair of upper and lower transparent glass substrates 4 and 5 with a seal material 7. In this case, of the opposing surfaces of the upper and lower pair of glass substrates 4 and 5, the opposing surface of the upper glass substrate 4 is formed with strip transparent electrodes 8 made of a conductive material such as indium oxide in parallel to each other. The opposing surface of the lower glass substrate 5 is formed with a large number of strip transparent electrodes 9 made of a conductive material such as indium oxide to perpendicularly intersect the transparent electrodes 8.

As shown in FIGS. 2A and 2B, the liquid crystal layer 6 is composed of a polymer-dispersed liquid crystal obtained by dispersing liquid crystal molecules 11 in a polymeric material 10. FIG. 2A shows an electric field OFF mode wherein no voltage is applied across the transparent electrodes 8 and 9 of the polymer-dispersed liquid crystal cell 2. The liquid crystal molecules 11 of the liquid crystal layer 6 are aligned in a random manner to set light passing through the liquid crystal layer 6 in the scattered state. FIG. 2B shows an electric field ON mode wherein a voltage is applied across the transparent electrodes 8 and 9. The liquid crystal molecules 11 of the liquid crystal layer 6 are aligned in the direction of electric field to indicate a transparent state. In this liquid crystal cell 2, the opposing region corresponding to portions where the transparent electrodes 8 of the upper glass substrate 4 and the transparent electrodes 9 of the lower glass substrate 5 intersect each other through the liquid crystal layer 6 forms one pixel. Therefore, as a whole, pixels each formed in this manner are aligned in a matrix.

As shown in FIG. 1, in the selective reflector 3, a large number of linear prisms 12 each having a triangular section are aligned on its surface opposing the liquid crystal cell 2, i.e., the glass substrate 5, at a predetermined interval, i.e., at an interval smaller than the pixel pitch of the liquid crystal cell 2. Specular reflection layers 13 are formed on the surfaces of the linear prisms 12.

As shown in FIG. 3, the section of each linear prism 12 forms a triangle, and the upper two sides of which form a vertex angle θ3 therebetween have different lengths, i.e., forms an axially asymmetric triangle, two bottom angles θ1 and θ2 of which are different. A length L of the bottom side of this linear prism 12 is, e.g., about 45 μm.

The specular reflection layer 13 is a film formed by depositing a metal, e.g., aluminum or silver, having a high reflectance on the surface of the linear prism 12 by vapor deposition or the like. In accordance with the angle of inclination of the linear prism 12, the specular reflection layer 13 reflects light, coming incident on it at an angle within the range of a viewing angle of the liquid crystal cell 2, in a direction outside the range of a viewing angle, so the reflected light will not be observed by the observer.

The operation of this liquid crystal display device 1 will be described. In the electric field OFF mode, as shown in FIG. 2A, the liquid crystal molecules 11 in the liquid crystal layer 6 of the liquid crystal cell 2 are aligned in the random manner to scatter light passing through the liquid crystal layer 6. Light passing through the liquid crystal cell 2 is scattered in the liquid crystal layer 6, so backward scattered light (in this case, light scattered toward the observer) directed in the opposite direction to the propagating direction of light coming incident on the liquid crystal cell 2 emerges toward the observer. Also, forward scattered light (in this case, light scattered toward the rear surface of the device) directed along the propagating direction of light coming incident on the liquid crystal cell 2 is reflected by the specular reflection layer 13 formed on the surface of the linear prism 12 of the selective reflector 3, and emerges toward the observer. As a result, bright white display can be obtained.

In the electric field ON mode, as shown in FIG. 2B, the liquid crystal molecules 11 in the liquid crystal layer 6 of the liquid crystal cell 2 are aligned in the direction of the electric field to exhibit a transparent state. Light beams passing through the liquid crystal cell 2 propagate straight in the same propagating direction and emerge toward the selective reflector 3 without being scattered. These exit light beams are reflected by the specular reflection layers 13 on the surfaces of the linear prisms 12 of the selective reflector 3 in accordance with the angles of inclination of the respective slants of the linear prisms 12 and emerge from the front surface of the liquid crystal cell 2. Since light coming incident on the liquid crystal cell 2 at an angle within the range of a viewing angle of the liquid crystal cell 2 is reflected by the specular reflection layer 13 in a direction outside the range of a viewing angle, the light intensity is weak near the direction of normal to the front surface of the liquid crystal cell 2, and sufficiently dark black display can be obtained. The specular reflection layers 13 on the surfaces of the linear prisms 12 can prevent the observer himself from being reflected.

In the first embodiment, each linear prism 12 of the selective reflector 3 has a triangular section, the two bottom angles θ1 and θ2 of which are different. Alternatively, according to the first modification of the liquid crystal display device of the first embodiment, each linear prism 12 may have a section of an axially symmetric isosceles triangle, two bottom angles θ1 and θ2 of which are equal.

Figure 4:
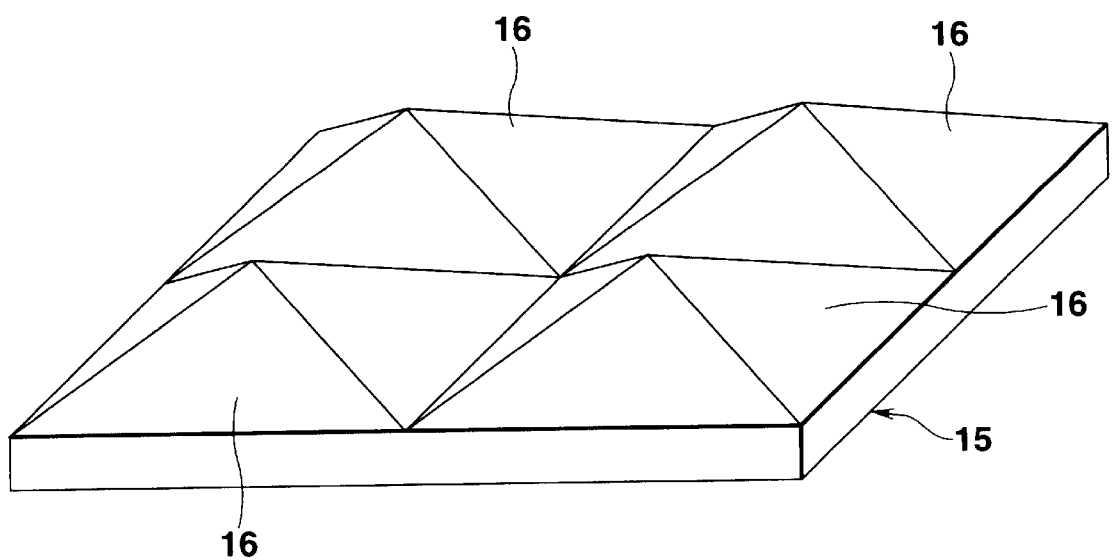
FIG. 4 is a partial enlarged view of a modification of the selective reflector of the liquid crystal display device according to the first embodiment of the present invention.

When a selective reflector 3 formed with such linear prisms 12 is used, the selective reflector 3 can reflect light axially symmetrically. Accordingly, a function and effect basically identical to those of the first embodiment can be obtained. FIG. 4 shows the second modification of the liquid crystal display device of the first embodiment. In the first embodiment, the linear prisms 12 each having a triangular section are aligned on that surface of the selective reflector 3 which opposes the liquid crystal cell 2. According to the second modification, quadrangular pyramidal prisms 16 may be aligned on that surface of the selective reflector 15 which opposes the liquid crystal cell 2, at an interval smaller than the pixel pitch of the liquid crystal cell 2 to be in tight contact with each other in the horizontal and vertical directions. The specular reflection layers 13 may be formed on the surfaces of the quadrangular pyramidal prisms 16. In this case, the quadrangular pyramidal prisms 16 can form regular quadrangular pyramids each having a section symmetrical in both the right-and-left direction and the back-and-forth direction. Alternatively, the quadrangular pyramidal prisms 16 may form quadrangular pyramids each having a section asymmetric in both the right-and-left direction and the back-and-forth direction.

With this selective reflector 15, light can be reflected in four directions by the specular reflection layer 13 formed on each slant of the quadrangular pyramidal prism 16.

Second Embodiment

Figure 5:
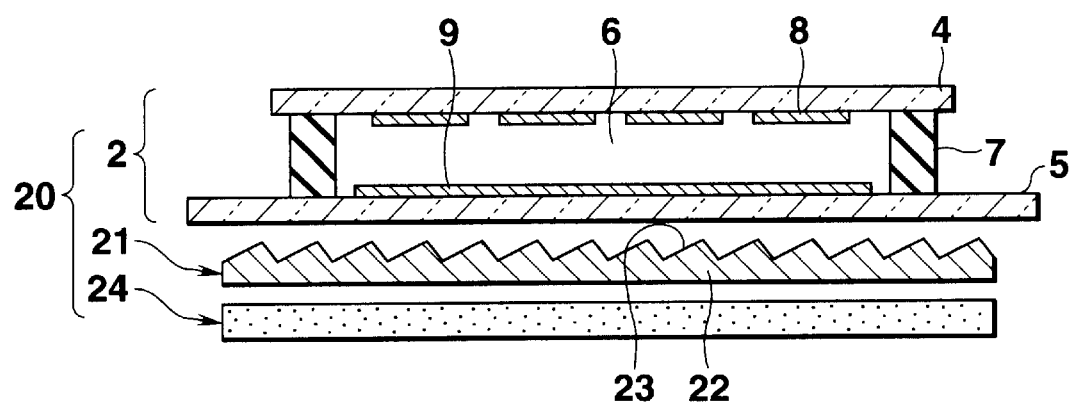
FIG. 5 is a sectional view showing a liquid crystal display device according to the second embodiment of the present invention.
Figure 6:
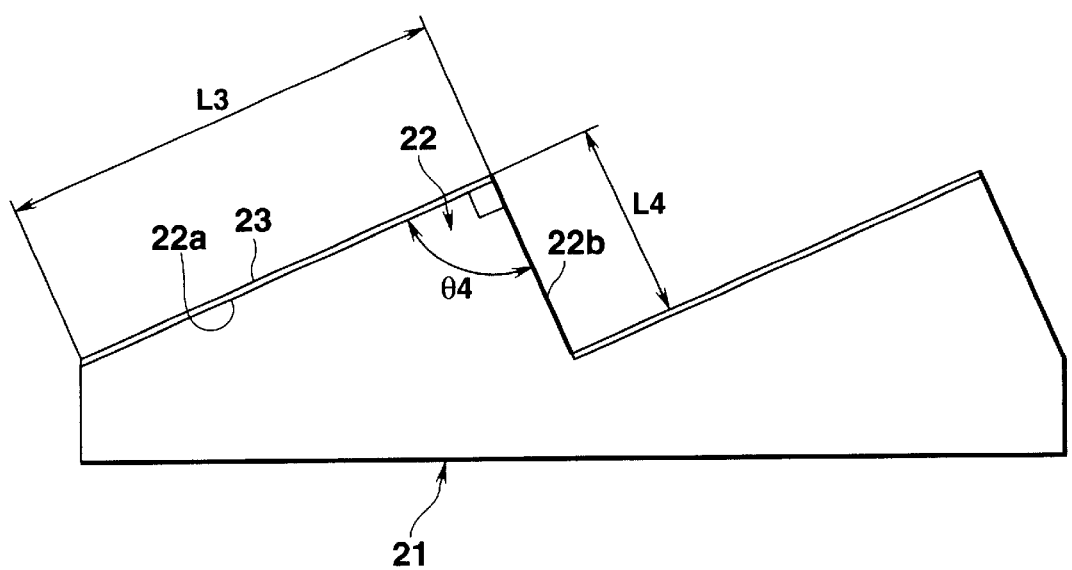
FIG. 6 is a partial enlarged view of FIG. 5.

FIGS. 5 and 6 show a liquid crystal display device according to the second embodiment of the present invention, in which FIG. 5 is a sectional view of the liquid crystal display device, and FIG. 6 is a partial enlarged sectional view of FIG. 5.

The liquid crystal display device according to the second embodiment is a liquid crystal display device 20 having a liquid crystal cell 2, a selective reflector 21 arranged to oppose the rear surface of the liquid crystal cell 2, and a light absorber 24 arranged to oppose the rear surface of the selective reflector 21. The liquid crystal display device of this embodiment is different from that of the first embodiment in the arrangement of the selective reflector 21 and in the presence of the light absorber 24. Other common constituent elements are denoted by the same reference numerals as in the first embodiment, and a detailed description thereof will be omitted.

As shown in FIG. 6, in the selective reflector 21 of this liquid crystal display device 20, a large number of linear prisms 22 each having a triangular section are aligned on its surface opposing the liquid crystal cell 2 at a predetermined interval. Of two slants 22a and 22b, on the liquid crystal layer 6 side, of each linear prism 22, one slant 22a is formed with a specular reflection layer 23, while the other slant 22b is exposed to be transparent. The two slants 22a and 22b of each linear prism 22 have different slant lengths L3 and L4 (L3>L4), respectively, and in this embodiment, a vertex angle θ4 opposing the light-exit surface of the liquid crystal cell 2 is 90°, thus forming a section of an axially asymmetrical triangle.

The specular reflection layer 23 is a film formed by depositing a metal, e.g., aluminum or silver, having a high reflectance on only the slant 22a, having a longer slant length, of the linear prism 22 by vapor deposition or the like. The specular reflection layer 23 reflects light in accordance with the angle of inclination of the slant 22a of the linear prism 22.

The light absorber 24 is composed of a black film that absorbs light, coming incident on it through the slant 22b of the linear prism 22 not formed with the specular reflection layer 23, and transmitted through the selective reflector 21.

In this liquid crystal display device 20, in the electric field OFF mode wherein no voltage is applied across transparent electrodes 8 and 9 of the liquid crystal cell 2, light coming incident on the liquid crystal cell 2 is scattered in a liquid crystal layer 6, and backward scattered light (in this case, light scattered toward the observer) directed opposite to the propagating direction of light coming incident on the liquid crystal cell 2 emerges toward the observer. In addition to the exit light in the form of backward scattered light, of forward scattered light beams (in this case, light beams scattered toward the rear surface of the device) directed along the propagating direction of light coming incident on the liquid crystal cell 2, most of the forward scattered light beams are reflected by the specular reflection layers 23 formed on the one-side slants 22a of the linear prisms 22 of the selective reflector 21 and scattered by the liquid crystal layer 6 again to emerge toward the observer, except for some forward scattered light beams coming incident on the other-side slants 22b of the surfaces of the linear prisms 22 of the selective reflector 21, and transmitted through the selective reflector 21. As a result, bright white display can be obtained.

In the electric field ON mode wherein a voltage is applied across the transparent electrodes 8 and 9 of the liquid crystal cell 2, light passing through the liquid crystal cell 2 is transmitted through it without being scattered, and emerges toward the selective reflector 21. Of these exit light beams, those which have come incident at an angle within the range of a viewing angle of the liquid crystal cell 2, come incident on the linear prisms 22 through the other-side slants 22b formed as transparent surfaces of their surfaces. These incident light beams are transmitted through the selective reflector 21 and absorbed by the light absorber 24 arranged below it.

Other light beams, which have come incident in a direction outside the range of a viewing angle and then emerge from the liquid crystal cell 2, are reflected by the specular reflection layers 23 formed on one-side slants 22a of the linear prisms 22 and emerge from the front surface of the liquid crystal cell 2. Note that most light beams emerge in a direction, within a different range of a viewing angle, which is the observing direction of the observer. Therefore, a reflection type liquid crystal display device, which can obtain sufficiently dark black display and high contrast, thus providing excellent visual recognition, can be obtained.

Figure 7:
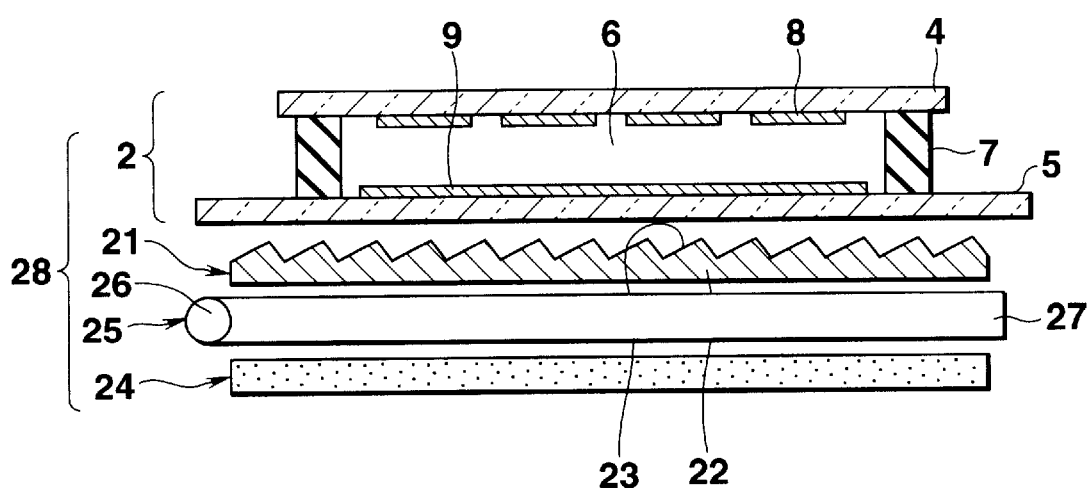
FIG. 7 is a sectional view in which the liquid crystal display device shown in FIG. 5 and a surface light source unit are combined.

As shown in FIG. 7, a liquid crystal display device 28 is also possible, in which an edge light type backlight unit 25 is arranged between a selective reflector 21 and a light absorber 24.

This backlight unit 25 has a light source 26 such as a fluorescent tube, and a light guide plate 27 for guiding light from the light guide plate 27. The light guide plate 27 opposes the rear surface of a liquid crystal cell 2 through a selective reflector 21, and the light source 26 is arranged on one end (left end in FIG. 7) of the light guide plate 27.

In this liquid crystal display device 28, when the light source 26 of the backlight unit 25 is OFF, as the light guide plate 27 of the backlight unit 25 is transparent, light emerging from the rear surface of the selective reflector 21 directly passes through the light guide plate 27, and does not emerge from the front surface of the liquid crystal cell 2.

When the light source 26 of the backlight unit 25 is ON, illumination light from the light source 26 is guided by the light guide plate 27 to irradiate the rear surface of the selective reflector 21. Light emerging from the other-side transparent slants 22b on the surfaces of linear prisms 22 comes incident on the rear surface of the linear prisms 22 in an oblique direction.

At this time, when a liquid crystal layer 6 of the liquid crystal cell 2 is in the electric field OFF state, illumination light passing through the liquid crystal cell 2 is scattered by the liquid crystal layer 6. Forward scattered light (in this case, light scattered by the liquid crystal cell 2 toward the observer) directed along the propagating direction of the illumination light emerges toward the observer. Of backward scattered light beams (in this case, light beams scattered by the liquid crystal cell 2 toward the rear surface of the device) directed in the opposite direction to the propagating direction of illumination light coming incident on the liquid crystal cell 2, most of the backward scattered light beams (in this case, light beams scattered by the liquid crystal cell 2 toward the rear surface of the device) are reflected by specular reflection layers 23 formed on one-side slants 22a of the linear prisms 22, and are scattered by the liquid crystal layer 6 again to emerge toward the observer, except for some backward scattered light beam coming incident on the one-side transparent slants 22b on the surfaces of the linear prisms 22 of the selective reflector 21. Since the illumination light emerges toward the observer after being scattered, transparent bright white display can be obtained.

When an electric field is applied to the liquid crystal cell 2 to set it in the transparent state, illumination light emerging from the transparent slants 22b on the surfaces of the linear prisms 22 emerges strongly in the direction of normal to the slants 22b, and accordingly propagates straight in the liquid crystal cell 2 obliquely. When the liquid crystal cell 2 is seen from this direction, this illumination light emerges in a direction outside the range of a viewing angle within which the exit light is not observed by the observer. As a result, transparent black display can be obtained.

In this manner, in this liquid crystal display device 28, the edge light type backlight unit 25 is set between the selective reflector 21 and light absorber 24. When the backlight unit 25 is OFF, the liquid crystal display device 28 can be used as a reflection type liquid crystal display device. When the backlight unit 25 is ON, the liquid crystal display device 28 can be used as a transparent liquid crystal display device.

When a color filter is formed on the inner surface of at least one substrate of the liquid crystal cell of this embodiment, a bright, high-contrast color liquid crystal display device not using a polarizing plate that utilizes reflected light can be obtained. The color filter may be formed on either the front- or rear-side substrate of the liquid crystal cell.

Third Embodiment

Figure 8:
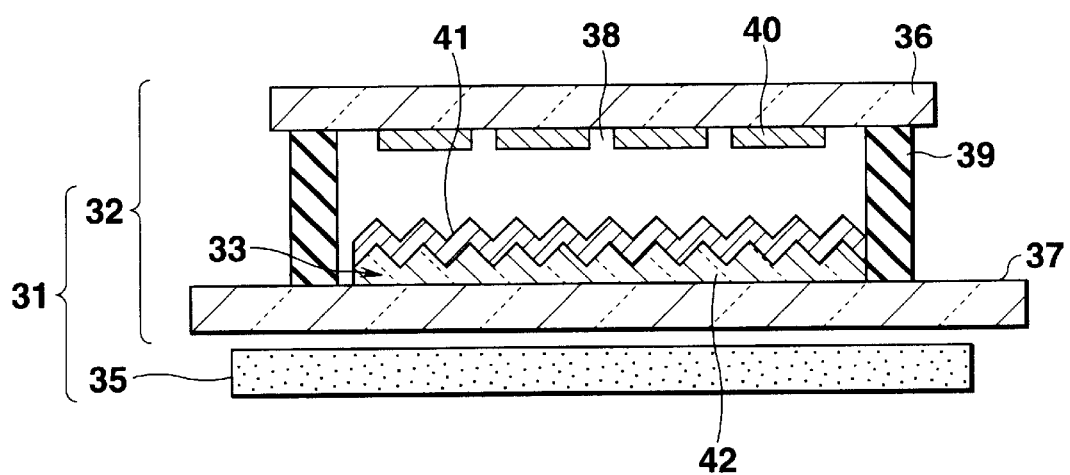
FIG. 8 is a sectional view showing a liquid crystal display device according to the third embodiment of the present invention.
Figure 9:
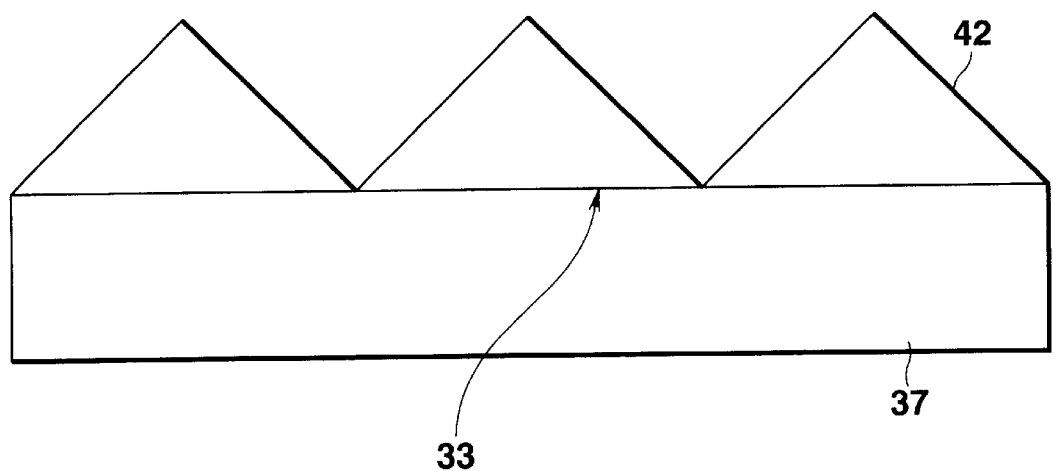
FIG. 9 is a partial enlarged view of FIG. 8.

FIG. 8 is a sectional view showing a liquid crystal display device according to the third embodiment of the present invention, and FIG. 9 is a partial enlarged sectional view of the same.

This liquid crystal display device 31 has a polymer-dispersed liquid crystal cell 32, a selective reflector 33 formed in the liquid crystal cell 32, and a light absorber 35 arranged on the rear side of the liquid crystal cell 32 through an air layer.

In the liquid crystal cell 32, a liquid crystal layer 38 is sealed between a pair of upper and lower transparent glass substrates 36 and 37 with a seal material 39. In this case, of the opposing surfaces of the pair of upper and lower glass substrates 36 and 37, the opposing surface of the upper glass substrate 36 has transparent electrodes 40, made of indium oxide or the like, aligned on it. The selective reflector 33 is formed on that surface of the rear-side glass substrate 37 which opposes the liquid crystal layer 38, i.e., on the inner surface of the glass substrate 37. Transparent electrodes 41 made of indium oxide or the like are aligned on the selective reflector 33 to perpendicularly intersect the upper transparent electrodes 40.

In this polymer-dispersed liquid crystal cell 32, in the electric field OFF mode wherein no voltage is applied across the transparent electrodes 40 and 41 of the pair of glass substrates 36 and 37, the liquid crystal molecules of the liquid crystal layer 38 are aligned in the random manner to exhibit a scattered state. In the electric field ON mode wherein a voltage is applied across the transparent electrodes 40 and 41 of the pair of glass substrates 36 and 37, the liquid crystal molecules of the liquid crystal layer 38 are aligned in the direction of electric field to exhibit a transparent state. In this liquid crystal cell 32, the opposing region where the transparent electrodes 40 of the upper glass substrate 36 and the transparent electrodes 41 of the lower glass substrate 37 intersect each other through the liquid crystal layer 38 forms one pixel. Pixels each formed in this manner are aligned in a matrix.

As shown in FIG. 9, in the selective reflector 33, a large number of linear prisms 42 each having an isosceles triangular section are aligned on its surface opposing the liquid crystal layer 38 at a predetermined interval, i.e., at an interval smaller than the pixel pitch of the liquid crystal cell 32. The refractive index and angle of inclination of the linear prisms 42 are designed so that the incident light beams within the range of a viewing angle (near the front surface) are transmitted toward the front surface of the liquid crystal cell 32, while other incident light beams are reflected in a direction outside the range of a viewing angle. More specifically, light transmitted through the linear prisms 42 emerges toward the air layer from the rear surface of the liquid crystal cell 32, and is absorbed by the light absorber 35. The light absorber 35 is a black film for absorbing light emerging from the glass substrate 37 on the rear surface of the liquid crystal cell 32.

The operation of this liquid crystal display device 31 will be described.

In the electric field OFF mode wherein no voltage is applied across transparent electrodes 40 and 41 of the liquid crystal cell 32, the liquid crystal molecules in the liquid crystal layer 38 of the liquid crystal cell 32 are aligned in the random manner to exhibit a scattered state. At this time, light passing through the liquid crystal cell 32 is scattered in the liquid crystal layer 38, and backward scattered light (in this case, light scattered by the liquid crystal cell 32 toward the front of the device) directed opposite to the propagating direction of light emerges toward the observer of forward scattered light beams (in this case, light beams scattered by the liquid crystal cell 32 toward the rear surface of the device) directed along the propagating direction of light, most of the forward scattered light beams are reflected by a plurality of slants of the linear prisms 42 of the selective reflector 33 on the liquid crystal layer 38 side, and by the interface between the selective reflector 33 and the lower glass substrate 37, and emerges toward the observer, except for some forward scattered light beams transmitted through the selective reflector 33 and passing through the air layer from the lower glass substrate 37 to be absorbed by the light absorber 35. As a result, bright white display can be obtained. Since the selective reflector 33 is formed on the inner surface of the lower glass substrate 37 of the liquid crystal cell 32 to be in contact with the liquid crystal layer 38, light loss is small, and reflectance in black display increases, so that bright white display can obtained.

In the electric field ON mode wherein a voltage is applied across the transparent electrodes 40 and 41, the liquid crystal cell 32 exhibits a transparent state. Light coming incident on the liquid crystal cell 32 is transmitted through the liquid crystal cell 32 without being scattered, and emerges toward the selective reflector 33.

When the exit light comes incident on the liquid crystal cell 32, within the range of a viewing angle, at an angle larger than the critical angle of total reflection of the interface between the liquid crystal layer 38 and linear prisms 42, or at an angle larger than the critical angle of total reflection of the interface between the selective reflector 33 and glass substrate 37, this incident light is reflected by the interface toward the front of the liquid crystal cell 32. This reflected light comes incident on the front-side substrate at a large angle with respect to the direction of normal to the front surface of the liquid crystal cell 32, and accordingly emerges to the outside of the range of a viewing angle.

When light comes incident at an angle smaller than the corresponding critical angle, it is transmitted while being refracted by the respective interfaces, emerges toward the air layer from the glass substrate 37, and is absorbed by the light absorber 35 arranged on the rear side of the liquid crystal cell 32.

Therefore, when light comes incident on the liquid crystal layer 38 within the range of a viewing angle, in the transparent state in the electric field ON mode, dark black display can be obtained. The selective reflector 33 is formed on the inner surface of the glass substrate 37 of the liquid crystal cell 32 to be close to the liquid crystal layer 38. When observing the liquid crystal cell 32 from the front surface, the parallax between a white-display pixel applied with no electric field and a black-display pixel applied with an electric field is small. When observing the liquid crystal cell 32 from obliquely above, a parallax between pixels, with which a black shadow forms on the edge of the white portion to make an image seen double, can also be prevented. As a result, clear, bright reflection type monochromatic display can be obtained.

Figure 10:
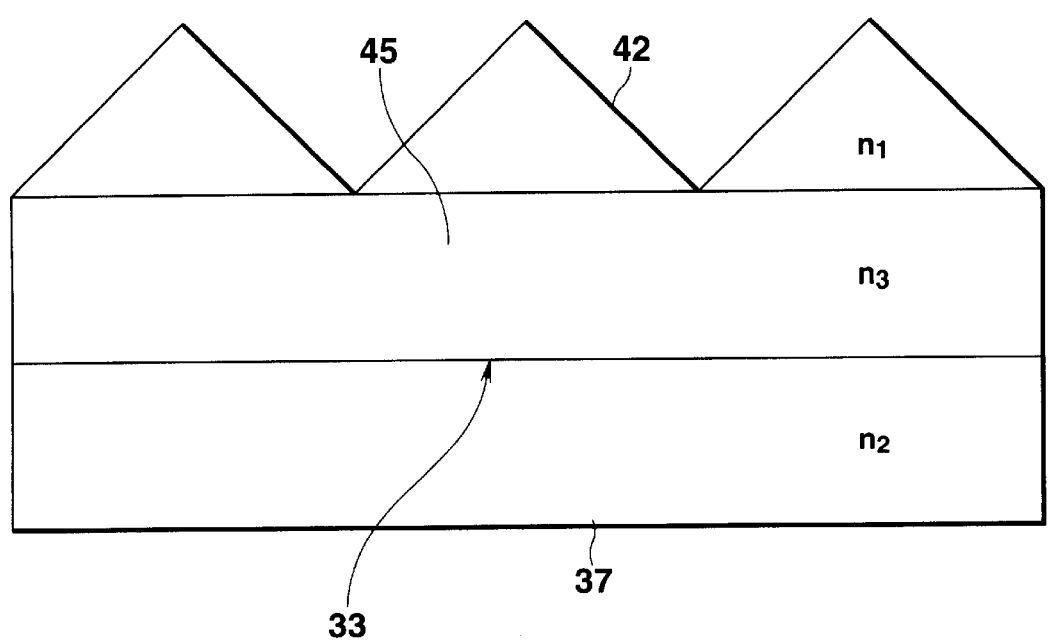
FIG. 10 is a partial enlarged view of a modification of the selective reflector of the liquid crystal display device according to the third embodiment.

In the third embodiment, the selective reflector 33 is directly formed on the inner surface of the lower glass substrate 37 of the liquid crystal cell 32. However, the present invention is not limited to this. For example, as shown in FIG. 10, a refraction layer 45 may be formed between the selective reflector 33 and the glass substrate 37. In this case, a refractive index n1 of the selective reflector 33, a refractive index n3 of the refraction layer 45, and a refractive index n2 of the glass substrate 37 may be different from each other (n1≠n3≠n2). Alternatively, the refractive index n1 of the selective reflector 33 and the refractive index n3 of the refraction layer 45 may be equal to each other, while only the refractive index n2 of the glass substrate 37 may be different from the refractive indices n1 and n3 (n1=n3≠n2). Then, the critical angle of total reflection can be changed by the incident angle, to accordingly adjust the range of a viewing angle.

Figure 11:
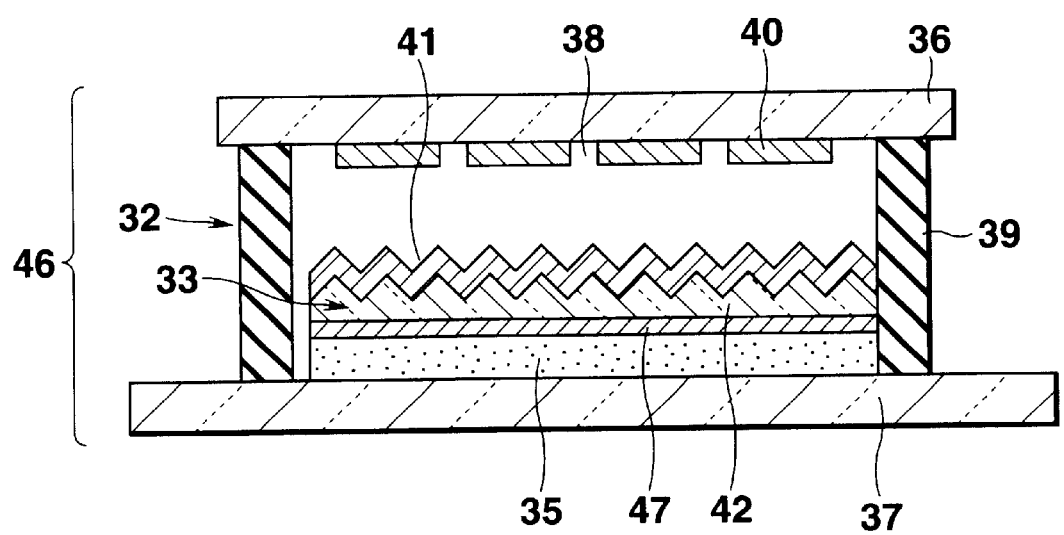
FIG. 11 is a sectional view showing a modification of the liquid crystal display device according to the third embodiment.

FIG. 11 shows a liquid crystal display device according to the second modification of the third embodiment. Portions that are identical to those of the second embodiment are denoted by the same reference numerals, and a detailed description thereof will be omitted.

In this liquid crystal display device 46, a light absorber 35 is formed on the inner surface (upper surface in FIG. 11) of a lower glass substrate 37 of a liquid crystal cell 32. A low-reflection layer 47 is formed on the upper surface of the light absorber 35. A selective reflector 33 is formed on the upper surface of the low-reflection layer 47. Transparent electrodes 41 are aligned on the upper surface of the selective reflector 33. Except for that, this liquid crystal display device 46 has the same arrangement as that of the second embodiment. The low-reflection layer 47 serves to suppress reflection of light emerging from the selective reflector 33 as much as possible and cause the light to come incident on the light absorber 35.

The liquid crystal display device 46 has the same function and effect as those of the third embodiment. In addition, since the light absorber 35 is formed on the inner surface of the lower glass substrate 37 and the low-reflection layer 47 is formed on the upper surface of the light absorber 35, reflection of light emerging from the selective reflector 33 is suppressed and this light is caused to come incident on the light absorber 35 efficiently so as to be absorbed by it. As a result, black display and the contrast performance when seen from the front surface are improved.

Fourth Embodiment

Figure 12:
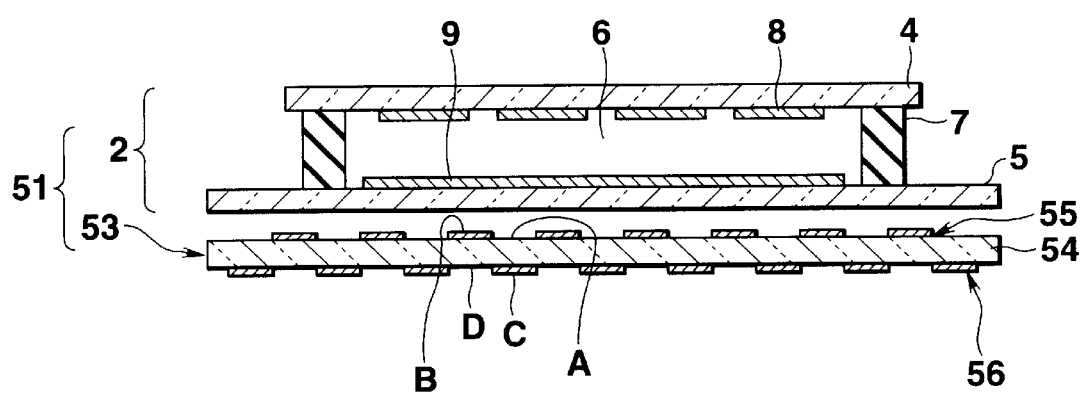
FIG. 12 is a sectional view showing a liquid crystal display device according to the fourth embodiment of the present invention.

FIG. 12 is a sectional view showing a liquid crystal display device according to the fourth embodiment of the present invention.

This liquid crystal display device 51 has a polymer-dispersed liquid crystal cell 2 and a selective reflector 53 arranged on the rear side of the liquid crystal cell 2. This liquid crystal display device is different from that of the first embodiment in only the arrangement of the selective reflector. Other common constituent components are denoted by the same reference numerals as in the first embodiment, and a detailed description thereof will be omitted.

As shown in FIG. 12, this selective reflector 53 has a transparent substrate 54, e.g., a glass substrate, arranged on the rear side of the liquid crystal cell 2. A first optical layer 55 where a plurality of light-transmitting portions A and light-absorbing portions B are aligned is formed on the front surface of the transparent substrate 54 opposing the liquid crystal cell 2. A second optical layer 56 where a plurality of light-absorbing portions C and light-reflecting portions D are aligned is formed on the rear surface of the transparent substrate 54. The selective reflector 53 absorbs light coming incident within the range (small-angle range) of an incident angle smaller than a predetermined incident angle with respect to the normal to the front surface of the selective reflector 53, and reflects light coming incident within the range (large-angle range) of an incident angle larger than that. The range of incident angle for absorbing this light coincides with the range of a viewing angle of the liquid crystal display device.

Figure 13:
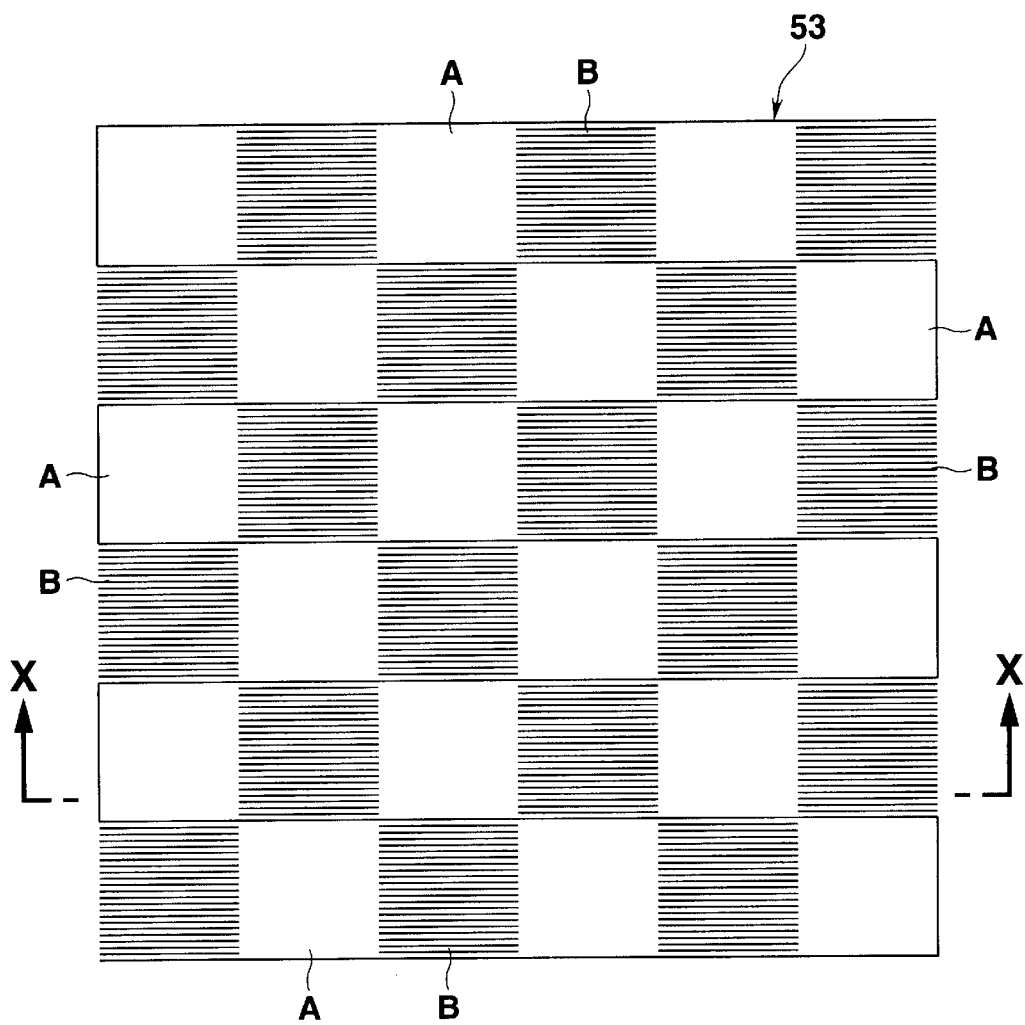
FIG. 13 is a plan view of the selective reflector of the liquid crystal display device according to the fourth embodiment.
Figure 14:
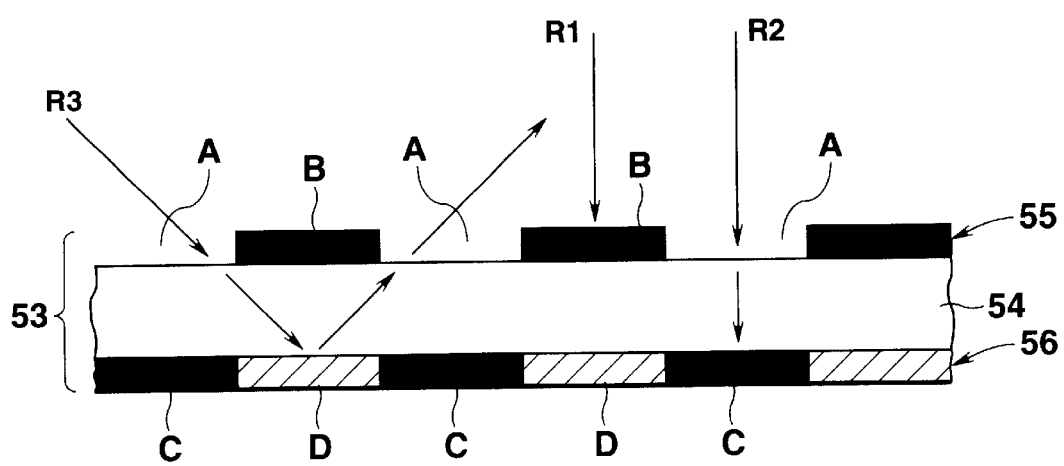
FIG. 14 is a sectional view of the selective reflector of the liquid crystal display device according to the fourth embodiment.

FIG. 13 is a plan view of the selective reflector 53 shown in FIG. 12, and FIG. 14 is a sectional view taken along the line X—X of FIG. 13. In the first optical layer 55, the light-transmitting portions A and light-absorbing portions B are aligned in the checkerboard pattern to be offset in the vertical and horizontal directions. In the second optical layer 56, in the same manner as in the first optical layer 55, the light-absorbing portions C and light-reflecting portions D are aligned in the checkerboard pattern to be offset in the vertical and horizontal directions. In this case, the respective light-transmitting portions A and light-absorbing portions B of the first optical layer 55, and the respective light-absorbing portions C and light-reflecting portions D of the second optical layer 56 have the same size and are formed at the same pitch. This pitch is set smaller than the pixel pitch of the liquid crystal cell 2. The light-transmitting portions A of the first optical layer 55 and the light-absorbing portions C of the second optical layer 56 correspond to each other, and the light-absorbing portions B of the first optical layer 55 and the light-reflecting portions D of the second optical layer 56 correspond to each other. The first and second optical layers 55 and 56 are formed on the front and rear surfaces of the transparent substrate 54 by printing or vapor deposition, to be distant from each other by a distance corresponding to the thickness of the transparent substrate 54.

In this liquid crystal display device 51, light being transmitted through the liquid crystal cell 2 is scattered in a liquid crystal layer 6. Backward scattered light (in this case, light scattered by the liquid crystal cell 2 toward the front surface of the device) directed in the opposite direction to the propagating direction of light passing through the liquid crystal cell 2 emerges toward the observer. Forward scattered light (in this case, light scattered by the liquid crystal cell 2 toward the rear side of the device) directed along the propagating direction of the light passing through the liquid crystal cell 2 is transmitted through a substrate 5 on the rear side of the liquid crystal cell 2 and emerges toward the selective reflector 53. Of the forward scattered light beams, light beams R1 and R2, coming incident within a predetermined range of a viewing angle and from a direction within the range of small angles with respect to the normal to the selective reflector 53, are absorbed by the respective light-absorbing portions B of the first optical layer 55 and the respective light-absorbing portions C of the second optical layer 56, respectively, of the selective reflector 53. A forward scattered light beam R3, coming incident on the selective reflector 53 at an angle outside the range of a viewing angle, is obliquely transmitted through the light-transmitting portions A of the first optical layer 55 and reflected by the light-reflecting portions D of the second optical layer 56. This reflected light beam passes through the light-transmitting portions A, which are different from the portions A through which this light beam R3 has come incident on the selective reflector 53, to emerge from a substrate 4 on the front side of the liquid crystal cell 2 in a direction outside the range of a viewing angle. Hence, in addition to the backward scattered light beam of the light coming incident on the liquid crystal cell 2, a light beam, which has come incident on the selective reflector 53 at the angle outside the range of a viewing angle and is reflected and scattered by the selective reflector 53, is observed, so that bright white display can be obtained.

In the electric field ON mode, light coming incident on the liquid crystal cell 2 is transmitted through the liquid crystal cell 2 without being scattered, and emerges toward the selective reflector 53. As shown in FIG. 14, of this exit light, a light beam, which has come incident on the selective reflector 53 at a small incident angle with respect to the normal to the selective reflector 53 in a range smaller than the range of a viewing angle, is either absorbed by the light-absorbing portions B of the first optical layer 55, or is transmitted through the light-transmitting portions A of the first optical layer 55 and is absorbed by the light-absorbing portions C of the second optical layer 56. Light, which has come incident on the selective reflector 53 at a large incident angle with respect to the normal to the selective reflector 53 in a range wider than the range of a viewing angle is either absorbed by the light-absorbing portions B of the first optical layer 55, or is transmitted obliquely through the light-transmitting portions A of the first optical layer 55 and is reflected by the light-reflecting portions D of the second optical layer 56 to emerge toward the observer. This reflected light emerges in a direction outside the range of a viewing angle of the observer. Since the intensity of light emerging toward the observer is weak, dark black display can be obtained.

In this manner, in the selective reflector 53 of this liquid crystal display device 51, the plurality of light-transmitting portions A and light-absorbing portions B of the first optical layer 55 are aligned alternately on the front surface of the transparent substrate 54. The light-absorbing portions C and light-reflecting portions D of the second optical layer 56 are alternately aligned on the rear surface of the transparent substrate 54. The light-transmitting portions A of the first optical layer 55 are set to correspond to the light-absorbing portions C of the second optical layer 56. The light-absorbing portions B of the first optical layer 55 are set to correspond to the light-reflecting portions D of the second optical layer 56. Hence, light coming incident on the transparent substrate 54 at a small angle with respect to the normal to the front surface of the transparent substrate 54 is absorbed by the light-absorbing portions B and C of the first and second optical layers 55 and 56, respectively. Part of light coming incident within a predetermined range of large visual angles is reflected by the light-reflecting portions D of the second optical layer 56 to emerge from the light-transmitting portions A which are different from the portions A through which this light has come incident on the first optical layer 55. This realizes selective reflecting function. In this case, the predetermined range of large visual angles, within which the incident light is reflected, can be set within an arbitrary range of angles by changing the sizes of the light-transmitting portions A and light-absorbing portions B, and of the light-absorbing portions C and light-reflecting portions D, the distance between the first and second optical layers 55 and 56, or the aligned positions of or the magnitude of errors between the light-transmitting portions A and light-absorbing portions B, and the light-absorbing portions C and light-reflecting portions D. The light-transmitting portions A and light-absorbing portions B of the first optical layer 55, and the light-absorbing portions C and light-reflecting portions D of the second optical layer 56 are formed on the front and rear surfaces of the transparent substrate 54 by printing or vapor deposition. Therefore, as compared to the selective reflector composed of microprisms, as shown in the first embodiment, the selective reflector 53 can be manufactured easily, and does not degrade easily, so the designed selective reflection characteristics can be obtained easily.

Fifth Embodiment

Figure 15:
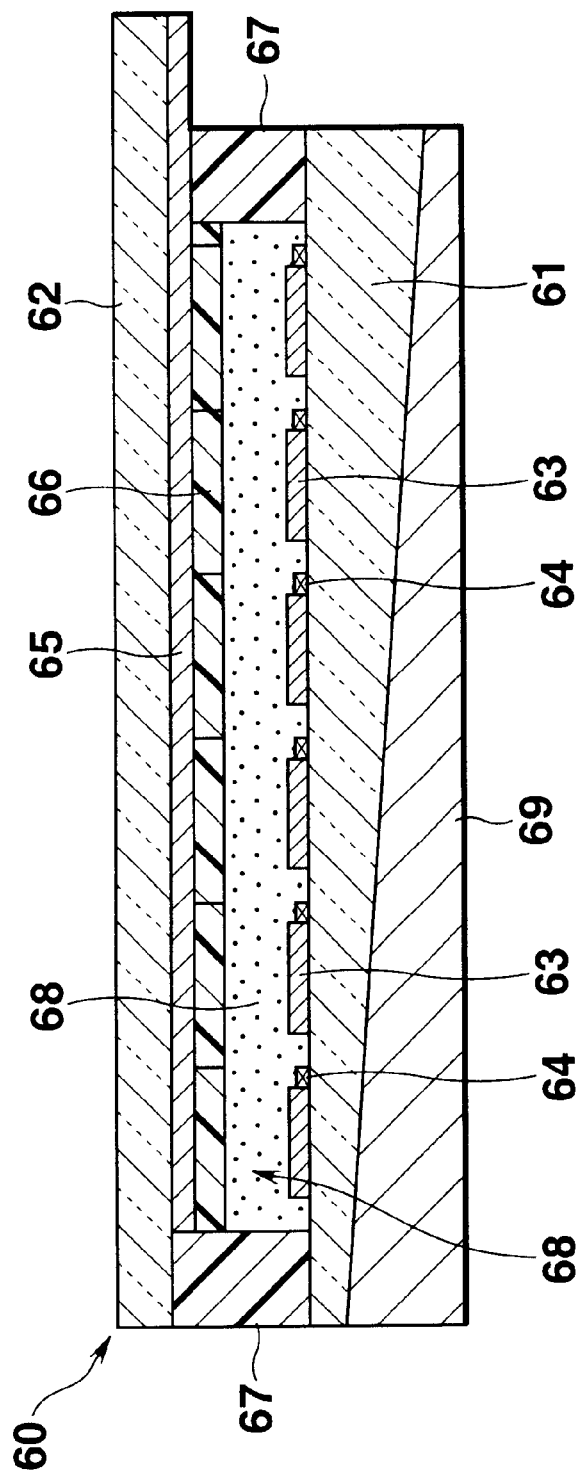
FIG. 15 is a sectional view showing a liquid crystal display device according to the fifth embodiment of the present invention.

FIG. 15 is a sectional view showing a liquid crystal display device according to the fifth embodiment of the present invention.

This liquid crystal display device 60 has a pair of opposing substrates 61 and 62 made of a transparent material such as glass. Pixel electrodes 63 made of a transparent conductive material such as indium oxide, and thin film transistors (TFTs) 64 are formed on the inner surface of the rear-side substrate 61. One common electrode 65 made of a transparent conductive material such as indium oxide is formed on the inner surface of the front-side substrate 62, and a color filter 66 is formed on the common electrode 65.

The peripheral edge portions of the rear- and front-side substrates 61 and 62 are bonded to each other through a seal material 67. A polymer-dispersed liquid crystal 68 is sealed in a region surrounded by the substrates 61 and 62 and the seal material 67.

When a voltage equal to the threshold or more is not applied across the common electrode 65 and pixel electrodes 63 through the liquid crystal layer 68 (to be referred to as a state wherein a sufficiently strong electric field is not applied hereinafter), the liquid crystal molecules are aligned in the random directions to scatter light passing through the liquid crystal layer 68. When a voltage equal to the threshold or more is applied across the common electrode 65 and pixel electrodes 63 (to be referred to as a state wherein a sufficiently strong electric field is applied hereinafter), the liquid crystal molecules are aligned in the direction of electric field. Light passing through the liquid crystal layer 68 is not scattered, but is transmitted to have the uniform propagating direction.

The substrates 61 and 62 are made of glass having a refractive index of 1.6. The pixel electrodes 63 and common electrode 65 are made of indium oxide films having a refractive index of 2.0. The color filter 66 is made of a polymer resin film having a refractive index of 1.5. The liquid crystal layer 68 is made of a liquid crystal material and a polymer resin that provide an average refractive index of 1.5 when an electric field is applied to the liquid crystal layer 68.

In this liquid crystal display device 60, a selective reflector 69 is arranged on the outer side of the rear-side substrate 61. The reflecting surface of the selective reflector 69 is formed to have a predetermined angle of inclination with respect to the inner surface of the substrate 61, as shown in FIG. 15.

The predetermined angle of inclination of the reflecting surface of the selective reflector 69 is set within such a range of a viewing angle that, when incident light coming incident in a direction outside the range of a viewing angle is reflected, the reflected light emerges at an angle larger than the incident angle on the reflecting surface with respect to the normal. Also, this predetermined angle of inclination is set at an angle equal to or more than the critical angle at which the light can be totally reflected by any interface when coming incident from a layer having a large refractive index to a layer having a small refractive index, among the substrate 61, the substrate 62, and the thin films formed on the substrates 61 and 62.

The operation of this liquid crystal display device 60 will be described with reference to FIGS. 16A and 16B. In this example, light coming incident on the liquid crystal display device 60 is the one inclined by 30° with respect to the direction of normal to the front surface of the liquid crystal display device 60, which is outside the range of a viewing angle of the liquid crystal display device 60. The reflecting surface of the selective reflector 69 is inclined by 25.7° with respect to the inner surface of the rear-side substrate of the liquid crystal display device 60. The incident angles for the respective layers are indicated by way of angles with respect to the normal to the inner surface of the substrate 62.

Figure 16A:
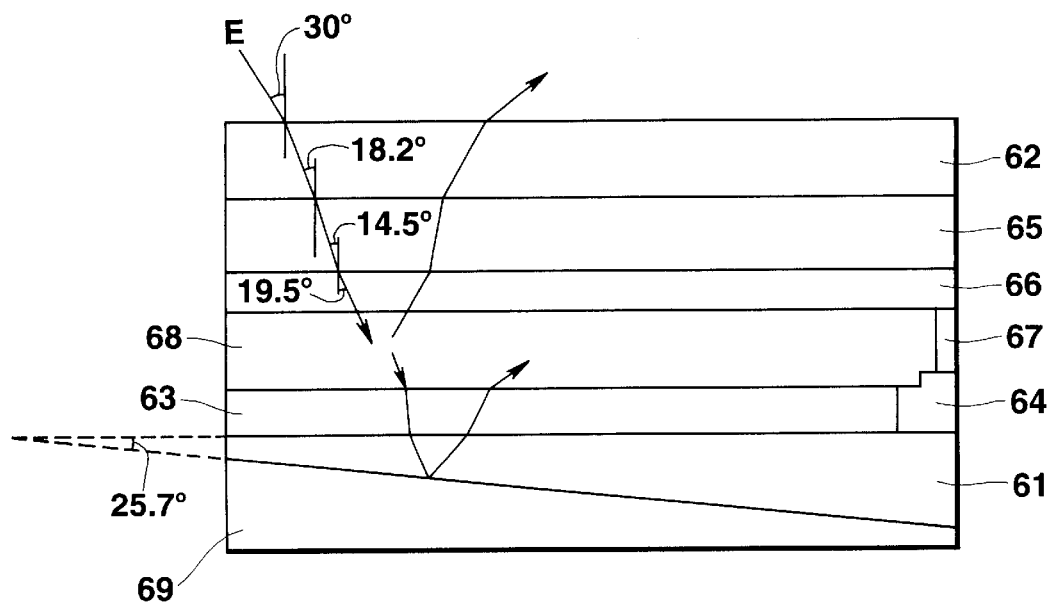

FIG. 16A shows the path of incident light E which has come incident on the substrate 62 at an incident angle outside the range of a viewing angle when a sufficiently strong electric field is not applied to the liquid crystal layer 68.

The incident light E is transmitted through the substrate 62, common electrode 65, and color filter 66 while being refracted, to come incident on the liquid crystal layer 68. During this period of time, the incident angle of the incident light E changes as follows due to the refraction. Namely, the incident light E comes incident on the substrate 62 at 30° which is an angle with respect to the normal to the inner surface of the substrate 62, and comes incident on the common electrode 65 at 18.2°. This light then comes incident on the color filter 66 at 14.5°, and on the liquid crystal layer 68 at 19.5°.

When no electric field is applied, light passing through the liquid crystal layer 68 is scattered and separates into backward scattered light (in this case, light scattered by the liquid crystal layer 68 toward the front of the device) directed toward the front surface of the device in the opposite direction to the propagating direction of the light, and forward scattered light (in this case, light scattered by the liquid crystal layer 68 toward the rear surface of the device) directed toward the rear surface of the device along the same direction as the propagating direction of the light. The backward scattered light is transmitted through the common electrode 65 and color filter 66 to emerge from the substrate 62 toward the observer, as shown in FIG. 16A. The forward scattered light passes through the pixel electrodes 63, is reflected by the selective reflector 69, and is scattered by the liquid crystal layer 68 again. This re-scattered forward scattered light repeats the path of being reflected by the selective reflector 69 and thereafter being scattered by the liquid crystal layer 68. Finally, this light forms backward scattered light to emerge from the substrate 62 toward the observer.

Figure 16B:
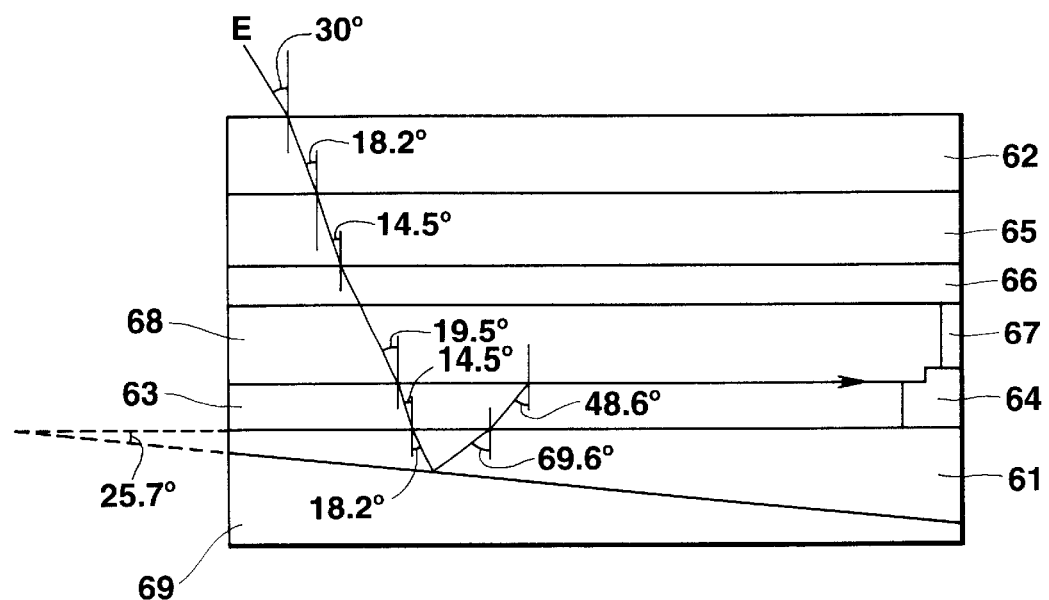

FIG. 16B shows the path of incident light E which has come incident on the substrate 62 at an incident angle outside the range of a viewing angle when a sufficiently strong electric field is applied to the liquid crystal layer 68.

The incident light E coming incident on the substrate 62 at an incident angle outside the range of a viewing angle propagates along the same path as that shown in FIG. 16A wherein the sufficiently strong electric field is not applied, as described above. More specifically, light coming incident on the inner surface of the substrate 62 at 30° from ahead of the liquid crystal display device 60 comes incident on the liquid crystal layer 68 at 19.5°.

When a sufficiently strong electric field is applied to the liquid crystal layer 68, light passing through the liquid crystal layer 68 travels straight without being substantially scattered, and comes incident on the pixel electrodes 63 at 19.5°. Light coming incident on the pixel electrodes 63 comes incident on the substrate 61 at 14.5°.

Light coming incident on the substrate 61 travels straight at 18.2° through the substrate 61, is reflected by the reflecting surface of the selective reflector 69 having an angle of inclination of 25.7° with respect to the inner surface of the substrate 61, and comes incident on the pixel electrodes 63 again. The incident light E is reflected by the reflecting surface of the selective reflector 69 to travel toward the front side of the liquid crystal display device from the substrate 61 at an incident angle (69.6°) larger than the incident angle with respect to the direction of normal to the inner surface of the substrate 62, at which the light E has traveled from the front-side substrate 62 to each the substrate 61 of the liquid crystal display device 60.

This large incident angle (69.6°), however, is equal to or larger than the critical angle at which the light is totally reflected by any interface when it comes incident on a layer having a small refractive index from a layer having a large refractive index while it travels through the pixel electrodes 63, liquid crystal layer 68, color filter 66, common electrode 65, and substrate 62 stacked on the inner surface of the substrate 61. Light cannot emerge ahead of this interface because a reflection angle at any interface is equal to or more than the critical angle for total reflection.

Therefore, in this example, assume that the pixel electrodes 63 has a refractive index of 2.0, the liquid crystal layer 68 in the electric field ON state has a refractive index of 1.5, and the incident angle at which light is incident from the rear direction toward this interface is θc. The condition for the critical angle of total reflection is sin θc>1.5/2.0. That is, light is totally reflected when θc>48.6° or more. Therefore, in this case, light does not pass through this interface but travels straight in parallel to this interface, and does not emerge from this liquid crystal display device.

As described above, regarding the incident angle E inclined by 30° with respect to the normal to the inner surface of the substrate 62 outside the range of a viewing angle, it is reflected by the selective reflector 69 to come incident on the substrate 61, and then comes incident on the interface between the substrate 61 and pixel electrodes 63 at 69.6°. This light then comes incident on the interface between the pixel electrodes 63 and liquid crystal layer 68 at 48.6°. From the critical angle conditions described above, this light cannot pass through the interface between the pixel electrodes 63 and liquid crystal layer 68.

If the incident light E comes incident on the substrate 62 at a larger angle of inclination, the angle of light coming incident on the interface between the substrate 61 and pixel electrodes 63 exceeds 69.6°. Since this light comes incident on the interface between the pixel electrodes 63 and liquid crystal layer 68 at 48.6° or more, it is totally reflected by this interface. Therefore, light coming incident at an angle outside the angular range of this visual angle is confined in this reflection type liquid crystal display element, and does not emerge ahead of the substrate 62.

As a result, with this reflection type liquid crystal display device 60, when a voltage is applied across the pixel electrodes 63 and common electrode 65, light coming incident on the front surface of the liquid crystal display device 60 within the range of a viewing angle does not emerge again from the front surface of the device.

In this manner, with the liquid crystal display device according to the fifth embodiment, when an electric field equal to or higher than the threshold is not applied to the liquid crystal layer 68, the backward scattered light scattered by the liquid crystal layer 68 and the scattered light, which is the reflected forward scattered light scattered by the liquid crystal layer 68 again, emerges from the substrate 62. The intensity of the scattered light observed when the liquid crystal layer 68 is in the scattered state becomes strong, and bright white display can be obtained.

When an electric field equal to or higher than the threshold is applied to the liquid crystal layer 68, light, coming incident from outside the range of a viewing angle of the liquid crystal display device and transmitted through the liquid crystal layer 68, is reflected by the selective reflector 69. After that, this reflected light is totally reflected by the interface between the pixel electrodes 63 and liquid crystal layer 68 and does not emerge from the front surface of the liquid crystal display device 60, as described above.

Therefore, this liquid crystal display device can increase the maximum value of the light exit rate with respect to its minimum value (i.e., the contrast ratio).

As compared to the conventional reflection type liquid crystal display device not using a polarizing plate, when an electric field equal to or higher than the threshold is applied to the liquid crystal layer, light coming incident from outside the range of a viewing angle is suppressed from emerging from the front surface of the liquid crystal display device. As a result, dark black display can be obtained.

In the above description, the reflecting surface of the selective reflector 69 is set at an angle of inclination of 25.7° with respect to the inner surface of the substrate 61. Light having an incident angle of 30° or more is defined to be outside the range of a viewing angle, and is confined in this liquid crystal display device. However, the angle of inclination of the reflecting surface of the selective reflector 69 can be arbitrarily set in accordance with the required range of a viewing angle or the incident angle of light emerging from the main light source in an expected situation.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A liquid crystal display device comprising:

a scattering/transparent liquid crystal cell having a liquid crystal layer for controlling incident light in a scattered or transparent state in accordance with an applied electric field; and a selective reflector arranged on a side of said liquid crystal layer opposite to a side where observation is performed, and having reflecting characteristics to cause light, which is incident from a direction within a predetermined range of a viewing angle that allows observation of said liquid crystal cell, to reflect in a direction outside the range of the viewing angle on the side where observation is performed;

wherein said selective reflector comprises a light incident surface that forms linear prisms each of which has first and second slants inclined in opposite directions, and a specular reflection layer formed on both of the first and second slants, the light incident surface having light reflecting characteristics that achieve dark black display.

\* \* \* \* \*